United States Patent [19]
MacNichol, Jr.

[11] 3,807,387
[45] Apr. 30, 1974

[54] TESTING METHOD AND APPARATUS FOR THE CONFIRMATION OF MONITORED ELECTROCEREBRAL SILENCE

[75] Inventor: Edward F. MacNichol, Jr., Potomac, Md.

[73] Assignee: The United States of America as represented by the Secretary of the Department of Health, Education, and Welfare, Washington, D.C.

[22] Filed: Apr. 10, 1972

[21] Appl. No.: 242,301

[52] U.S. Cl............................ 128/2.1 B, 128/2.1 R
[51] Int. Cl................................................ A61b 5/04
[58] Field of Search..... 128/2.06 B, 2.06 G, 2.06 R, 128/2.06 V, 2.1 B, 2.1 R, 2.1 Z

[56] References Cited
UNITED STATES PATENTS
| | | | |
|---|---|---|---|
| 2,648,822 | 8/1953 | Walter | 128/2.1 B |
| 3,602,215 | 8/1971 | Parnell | 128/2.06 B |
| 3,347,223 | 10/1967 | Pacela | 128/2.1 Z |

Primary Examiner—William E. Kamm

[57] ABSTRACT

A testing method and apparatus for accurately confirming a monitored condition indicative of electrocerebral silence while the cortical activity of a patient is being recorded by an electroencephalograph device of the type comprising a plurality of electrodes and associated leads disposed in contact with the patient's head and coupled through various amplification channels to a recording and read-out mechanism. The method and apparatus contemplate the injection of a first current signal into the patient's head at a preselected location and in a fashion such that detectable traces will be produced in all channels of the electroencephalograph device only if the electrodes make adequate contact with the patient's head. Additionally, a second signal of predetermined potential is induced into all of the electrode leads such that the detectable traces in each channel provides a reference calibration against which monitored cortical activity can be measured.

11 Claims, 3 Drawing Figures

PATENTED APR 30 1974 3,807,387

TESTING METHOD AND APPARATUS FOR THE CONFIRMATION OF MONITORED ELECTROCEREBRAL SILENCE

BACKGROUND OF THE INVENTION

This invention generally relates to the medical testing arts and particularly concerns a novel testing method and apparatus which establishes positive criteria for the determination of cerebral death.

Electroencephalograph devices, herein termed EEG apparatus, are commonly utilized in the medical profession for the diagnosis of brain injuries and other malfunctions. Such EEG apparatus typically includes a plurality of electrodes and associated leads which are disposed in contact with the patient's scalp or head and which are coupled through various amplification channels to a recording and read-out mechanism, such as a graphical recorder. As is known, cortical activity within the patient is electrically sensed by the electrodes and recorded on a chart or the like to thus provide what is termed an electroencephalogram. EEG apparatus are also utilized as a sensing or monitoring instrument to determine the onset of cerebral death of a patient and, in this respect, the important criteria for the determination of cerebral death is the monitored absense of cortical activity greater than two microvolts in any lead in the standard electrode montage coupled to the patient's head during specified periods of observation. Of course, when cerebral death is determined, resuscitative measures and other treatment of the patient are normally terminated.

This criterion for the determination of cerebral death is a negative criterion and, as such, oftentimes is difficult to positively establish or confirm. For example, the EEG apparatus could give a read-out or recording indicative of cortical activity less than two microvolts due to an internal malfunction within the EEG apparatus and particularly of the amplification channels thereof. Alternatively, if the electrodes actually coupled to and in contact with the patient's head are not in proper or adequate electrical contact, the high resistance thereby established between the electrodes and the patient's head can oftentimes produce false readings at less than the required two microvolts of cortical activity. Furthermore, two microvolts is not greatly above the level of electrical noise even under ideal conditions of EEG apparatus use, and thus there is no assurance that cortical activity of two microvolts could, in fact, be monitored by the EEG apparatus in the unfavorable environmental conditions under which the EEG apparatus is oftentimes used.

SUMMARY OF THE INVENTION

It is therefore apparent that some positive testing criteria are needed for assuring that signals from the scalp and head of the patient even as small as two microvolts could, in fact, be recorded by the EEG apparatus if such signals were actually present. If such positive criteria could be so established, malfunction of the EEG apparatus, improper connection of the electrodes, and the like, could readily be eliminated from the possible causes of a lack of monitored cortical activity. It is the primary object of the instant invention to provide a testing method and apparatus by which such positive criteria for the determination of electrocerebral silence or cerebral death are established.

A further objective of the instant invention concerns the provision of a novel testing method and apparatus which specifically eliminates from the possible causes of a lack of mon-itored activity, a malfunction of the EEG apparatus, the novel testing method and apparatus assuring that all EEG channels are functioning correctly, including the external leads to the EEG equipment, and that the electrode leads are functionally connected to the patient's scalp.

Another objective of the invention is the provision of a testing apparatus which induces an identical voltage calibration signal in all leads of an EEG apparatus simultaneously giving recorded deflections of the written trace on the record derived from each channel which can be used in routine EEG analysis to evaluate precisely the relative electrical activities picked up by different leads from the patient's brain. This comparison, particularly between corresponding leads on the right and left sides of the patient's head is important in routine EEG analysis quite apart from the application to cerebral death.

A still further object of the invention is the provision of a testing apparatus which periodically and automatically induces square wave signals of about 1 Hz having a steep rate of rise and fall into all leads of an EEG apparatus not only for the purpose of voltage calibration, but also for monitoring the settings of the high frequency and low frequency cut off controls of the individual EEG channels to assure that they have been correctly set. A low setting of the high frequency cut off control is evidenced by a slow rise and fall of the trace in response to the 1 Hz square wave calibrating signal. The rate of decay of the flat part of the square wave indicates the setting of the low frequency cut off control.

These objects as well as others which will become apparent as the description proceeds are implemented by the novel testing method and apparatus of the instant invention which invention, as aforestated, is contemplated to preferably provide a means for accurately confirming a monitored condition indicating electrocerebral silence while the cortical activity of a patient is being monitored by an EEG apparatus of the type comprising a plurality of electrodes and associated leads disposed in contact with the patient's head and coupled through various amplification channels to a recording and read-out mechanism.

In the preferred inventive embodiment, an oscillator or multivibrator means is coupled to a transformer to generate a first square wave constant current signal of a frequency of about 1 Hz which is injected into the patient's head at preselected locations. The recording and read-out device of the electroencephalograph is then monitored with respect to each channel thereof and detectable traces will be produced in all channels of the EEG only if the electrodes of the EEG apparatus make adequate functional contact with the patient's head. The novel invention further contemplates the provision of a second multivibrator or oscillator and driver conduit means which generates a second periodic signal of predetermined magnitude at a frequency of about 1 Hz. This second signal is coupled to a transformer and subsequently induces a square wave standard or constant potential waveform via a magnetic coupling apparatus into all of the electrode leads of the EEG apparatus. The recording and read-out device of the EEG apparatus is monitored and detectable traces in each channel provide a reference calibration against which monitored cortical activity can be measured. In this fashion, a malfunction of the EEG apparatus and particularly of the amplification channels thereof can be detected. The first and second signals are contemplated to be successively rather than concurrently produced and are generated in bursts.

The novel testing method and apparatus of the instant invention therefore provides positive criteria to assure that even small signals from the head and scalp of the patient would be monitored by the EEG apparatus if such signals existed.

BRIEF DESCRIPTION OF THE DRAWINGS

The invention itself will be better understood and features and advantages thereof in addition to those above-discussed will become apparent from the following detailed description of a preferred inventive embodiment, such description making reference to the appended single sheet of drawings, wherein.

DETAILED DESCRIPTION OF THE PREFERRED INVENTIVE EMBODIMENT

Figure 2:
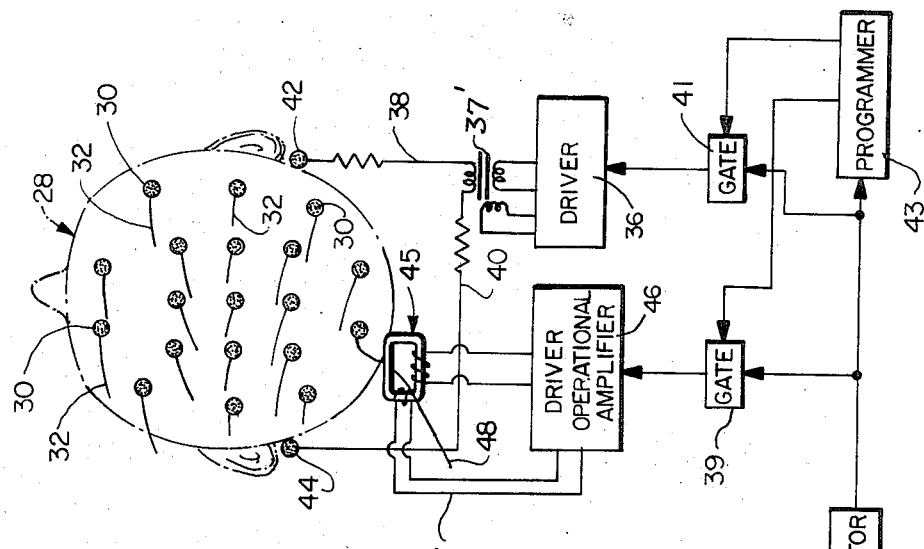
FIG. 2 is a schematic plan view of a plurality of EEG electrodes coupled in a typical montage to a patient's head, the oscillator means and associated electrical connections of the instant invention further being illustrated.
Figure 1:
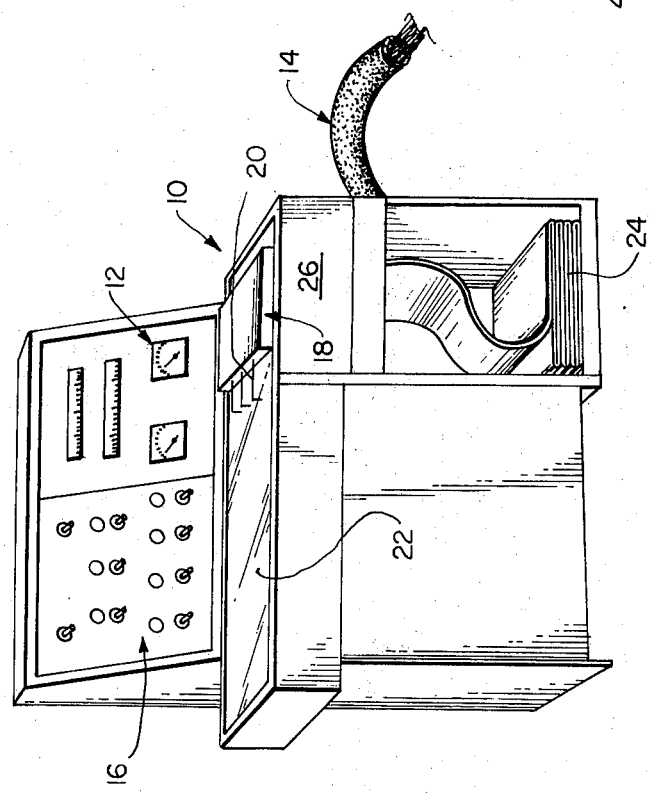
FIG. 1 is a perspective illustration of a typical electroencephalograph or EEG apparatus.

Referring now to FIG. 1, a schematic illustration of a typical and conventional EEG apparatus is depicted, the apparatus generally comprising a console 10 including a plurality of channel amplifiers 12. Leads contained within a cable generally designated 14 are coupled between respective channels of the amplifiers 12 and electrodes which are adapted to be disposed at and in contact with a patient's head, such as is indicated in FIG. 2. The particular connection between various ones of the channel amplifiers 12 and various ones of the electrode leads can be manually or automatically selected by the operator of the EEG apparatus by means of an electrode selector panel 16.

The EEG apparatus further includes a recording and readout mechanism, generally designated by reference numeral 18, which read-out device typically comprises a graphical recorder including a plurality of pens 20, with each pen being coupled to an individual one of the plurality of channel amplifiers 12. The pens 20 serve to write upon an elongated or continuous web of paper 22, which paper is stored in a compartment 24 and fed by a paper feed device 26, as is known.

Referring now to FIG. 2, the actual connection of the EEG apparatus of FIG. 1 to the head of a patient generally designated by reference numeral 28 is illustrated. In this respect, a plurality of electrodes 30 are disposed in intimate contact with the scalp of the patient, electrodes 30 either comprising disc or surface electrodes, or alternatively, subdermal electrodes which are placed slightly under the skin of the scalp. Each of the electrodes 30 includes a conductive lead 32 which is connected to the EEG apparatus via electrode connecting cable 14 (see FIG. 1), the electrodes defining various channels of the EEG apparatus. The particular placement of the electrodes upon the scalp of the patient, i.e., the electrode montage, is standard in the art.

Figure 3:
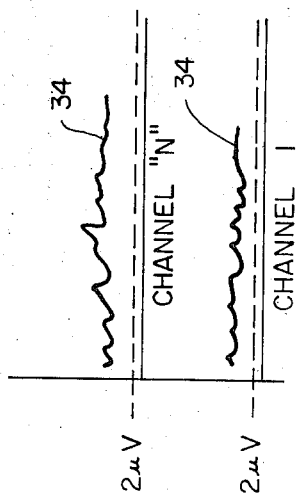
FIG. 3 is a graphical illustration of typical read-outs on the various channels of an EEG apparatus.

Referring to FIG. 3 of the appended drawings, typical read-outs for several channels of the EEG apparatus of FIG. 1 are illustrated and it will be seen that the pens 20 of the recording and read-out device 18 inscribe a line 34 upon the graph or recording paper 22, the read-out from each one of the channel amplifiers 12 being indicative of the electrical signal sensed by various pairs of electrodes 30.

As above-discussed, normal cortical activity within a patient serves to generally provide a signal in each of the EEG channels having a magnitude greater than two microvolts, as is illustrated in FIG. 3 of the appended drawings. When cerebral death occurs, the level of cortical activity monitored decreases. As discussed, an important element in establishing criteria for the determination of electrocerebral silence or cerebral death is the absence of cortical activity greater than two microvolts in any lead of the EEG apparatus in a standard montage during specified periods of observation. However, factors other than the onset of cerebral death can, in fact, cause the EEG apparatus depicted in FIG. 1 to provide a read-out or recording which is of a low enough value to falsely indicate electrocerebral silence, these factors including, but not being limited to improper operation of EEG amplification channels including the external leads, and improper functional connection of the electrodes and leads to the patient's scalp. The instant invention contemplates to provide positive criteria for the accurate determination of electrocerebral silence and, as such, eliminate apparatus malfunction from possible causes of indicated electrocerebral silence.

Referring again to FIG. 2 of the appended drawings, the novel testing apparatus of the invention contemplates the provision of a multivibrator or oscillator means 37 which generates a 1 Hz square wave output coupled through controllable gates 39 and 41 to a driver/operational amplifier 46 and driver 36, respectively. Gates 39 and 41 are controlled by any suitable programmer 43 also coupled to multivibrator 37 such that gates 39 and 41 are successively and periodically closed or made conductive for predetermined time durations.

A signal having a frequency on the order of 1 Hz with a waveform having suitable characteristics to generate a square wave of current in the leads 38 and 40 is generated by driver 36 under control gate 41. This first current signal is injected through a transformer 37' via leads 38 and 40 and associated resistances and electrodes 42 and 44, respectively, into the patient's head at a preselected location. The location may, for example, be between the vertex and chin of the patient, between the patient's ears as shown, or between the nasion and inion of the patient depending upon the particular recording lead configuration used. The magnitude of the current signal injected into the patient's head is about 1–10 microamps. It should be noted that transformer 37' and driver 36 effectively define means for isolating this current generating circuit from ground and from the remainder of the circuitry associated with the EEG apparatus. The injected current will be sensed by the standard EEG electrodes 30 and, if the electrodes 30 are in proper, adequate functional contact with the patient's head, a detectable trace will be produced in all channels of the EEG apparatus.

It should further be noted that the signal applied to the patient's head is a so-called "constant current" signal in that the current induced in the head is independent of the resistances of the electrodes through which the current is injected into the patient's head over a wide range. The voltage is immaterial and undefined and depends directly upon the electrode resistance.

In addition, and in a successive manner, driver/operational amplifier 46 serves to integrate the output from multivibrator 37 and produce an output current which is applied to the primary winding of a magnetic transducer such as open core transformer 45, which transformer has a feedback loop 47 coupled back to the amplifier 46, so that the output voltage comprises a constant current ramp signal. This ramp signal induces a second voltage signal of predetermined magnitude, i.e., 5–50 microvolts, and preferably having the same electrical characteristics of the first current signal in all the leads 32 from the EEG electrodes 30, which leads pass through the open core of transformer 45. In FIG. 2 of the appended drawings, only one lead 48 is depicted as passing through the open core for illustrative clarity.

The second voltage signal produced by the driver 46 is thus induced into all of the electrode leads of the EEG apparatus. The recording and read-out mechanism of the EEG apparatus would therefore produce detectable traces in each channel which are indicative of the value of the induced second voltage, which traces would have a magnitude equal to the induced voltage magnitude if all amplification channels 12 of the EEG apparatus were operating properly. Accordingly, the detectable traces so produced in each channel of the EEG apparatus provides a reference calibration against which the monitored cortical activity of the patient can be measured. In this fashion, an accurate calibration is simultaneously applied to all electrode leads of the EEG apparatus without interrupting the leads or interfering in any way with normal EEG operation.

The signal induced magnetically in the EEG leads is a so-called "constant voltage" signal which is independent of the resistance of the EEG electrodes as long as they are reasonably low, and independent of the input impedance of the EEG amplifier input impedance as long as it is high. The current is directly proportional to the sum of the EEG amplifier input resistance which is very large and the electrode resistances which are unpredictable, though small and unimportant.

From a technical viewpoint and in the preferred embodiment, the same means are used to produce the square wave signals in both circuits as far as the primary windings of the transformer 37' and 45. The only difference is that a single turn secondary winding comprising the EEG leads threaded through the core is used for inducing the calibrating voltage, and a secondary winding with many turns in series with a high resistance is used for driving the current to be injected into the patient's head. The drivers 46 and 36 are preferably identical. If the frequency of the square waves was high, the outputs of the drivers would be a square wave. However, because the time constant of the driver circuit and primary winding $t=L/R<<\frac{1}{2}$ sec., both transformers 37' and 45 effectively take the time derivative of the input waveform. Thus the required drive output waveform should be the time integral of a square wave, i.e., a ramp function. This function is most conveniently generated by putting a tertiary winding on each transformer core and using the output from this winding as negative feedback which forces the output waveform to be the same as the input square wave input signal derived from the multivibrators and gates. The principle of operational feedback used here is well known in the art of analog computation.

In the preferred operational mode and as controlled by programmer 43, the first current signal provided by driver 36 can continuously be applied for three to five cycles followed by the application of the induced second current generated by driver 46 for a duration of three to five cycles, periodically during EEG monitoring. This cyclic operation is preferably repeated at preselected intervals, such as once or twice during each minute of operation of the EEG apparatus so as to provide a continual "check" on the accuracy and veracity of the EEG readings.

It should be appreciated by those skilled in the art that the instant invention has been discussed only in terms of an exemplary preferred embodiment and that various obvious modifications thereto can be made. Accordingly, the invention is to be construed and limited only by the scope of the appended claims. Accordingly,

What is claimed is:

1. A testing method for accurately confirming a monitored condition indicating electrocerebral silence while the cortical activity of a patient is being recorded by an electroencephalograph of the type comprising a plurality of electrodes and associated leads disposed in contact with the head of the patient and coupled through amplification channels to a recording and read-out mechanism, said method comprising the steps of:

injecting independently of the electrodes a first current signal distinguishable from the monitored cortical activity into the head of the patient at a preselected location without interrupting the leads and without interfering with the normal operation of the electroencephalograph, and monitoring the recording and read-out mechanism of the electroencephalograph with respect to each channel, detectable traces of said first current signal being produced in all channels only if the electrodes make adequate functional contact with the head of the patient; and inducing a second voltage signal of predetermined magnitude into all of the electrode leads without interrupting the leads and without interfering with the normal operation of the electroencephalograph, and monitoring the recording and read-out mechanism of the electroencephalograph, detectable traces of said second voltage signal in each channel providing a reference calibration against which monitored cortical activity can be measured, whereby positive criteria are established to assure that even small signals from the scalp of the patient would be monitored by the electroencephalograph if such signals existed.

2. A method as defined in claim 1, wherein saie injecting step comprises injecting said first current signal into the head of the patient by means of a pair of leads and associated auxiliary electrodes.

3. A method as defined in claim 1, wherein said inducing step comprises inducing magnetically said second voltage signal in all of the electrode leads by means of a single magnetic core in which a changing magnetic flux of appropriate waveform is induced.

4. A method as defined in claim 1, wherein said first and second signals comprise square waves of constant current and constant voltage, respectively.

5. A method as defined in claim 4, wherein said square waves have a frequency of about 1 Hz, and a current magnitude of about 1–10 microamperes, and a voltage magnitude of about 5–50 microvolts, respectively.

6. A testing apparatus for use with an electroencephalograph of the type comprising a plurality of electrodes and associated leads disposed in contact with the head of a patient and coupled through amplification channels to a recording and read-out mechanism, said testing apparatus comprising:

first means for providing a first current signal;

electrode means connected to said first means and adapted to be placed in contact with the head of the patient at a preselected location for injecting said first current signal into the head of the patient;

second means for providing a second voltage signal; and magnetic coupling means connected to said second means and adapted to be associated with the plurality of electrodes and associated leads of the electroencephalograph for inducing said second voltage signal into all of the electrode leads of the electroencephalograph, whereby the first current signal will produce detectable traces in all channels of the electroencephalograph only if the electrodes of the electroencephalograph make adequate contact with the patient's head, and whereby the second signal provides detectable traces in each channel of the electroencephalograph defining a reference calibration voltage against which monitored cortical activity can be measured.

7. A testing apparatus as defined in claim 6, wherein said magnetic coupling means comprises a first transformer having an open core through which passes all of the electrode leads of the electroencephalograph.

8. A testing apparatus as defined in claim 7, wherein said first transformer includes a primary, secondary and feed-back winding; said first means comprises oscillator means for generating square waves, sequential programming means connected to said oscillator means for sequencing said first current signal and said second voltage signal, a first controllable gate coupled to said sequential programming means and connected to said oscillator means, a second transformer having a primary and secondary winding and connected to said electrode means, a first driver amplifier coupled to said first gate and having an output connected to said primary winding of said second transformer; said second means comprises a second controllable gate coupled to said sequential programming means and connected to said oscillator means, a second driver amplifier coupled to said second gate and connected to said feedback winding of said first transformer, said second driver amplifier having an output connected to said primary winding of said first transformer; and wherein the output from said secondary winding of said first transformer comprises a square wave defining said voltage signal, and the output from said secondary winding of said second transformer comprises a square wave defining said first current signal.

9. A testing apparatus as defined in claim 8, wherein the frequency of said first and second signals are of a frequency of approximately 1 Hz.

10. A testing apparatus for a conventional operating EEG apparatus comprising means for inducing identical voltage calibration signals in all leads of the EEG apparatus simultaneously without connection to the leads, and recording deflections of the written trace on the record derived from each channel without interfering with the normal operation of the EEG apparatus, whereby such deflections can be used in routine EEG analysis to evaluate precisely the relative electrical activities picked up by different leads from the brain of the patient.

11. A testing apparatus for a conventional operating EEG apparatus comprising means for periodically and automatically inducing square wave signals of a frequency of about 1 Hz having a steep rate of rise and fall into all leads of an EEG apparatus without interfering with the normal operation of the EEG apparatus and without interrupting the leads, whereby voltage calibration can be made and the settings of the high frequency and low frequency cut off controls of the individual EEG channels can be monitored to assure that they have been correctly set.

* * * * *